United States Patent
Harada et al.

(10) Patent No.: US 6,509,420 B1
(45) Date of Patent: Jan. 21, 2003

(54) POWDER COATING COMPOSITION COMPRISING EPOXY GROUP-CONTAINING ACRYLIC RESIN

(75) Inventors: Yoko Harada, Aichi (JP); Motoshi Inagaki, Aichi (JP); Koji Shimizu, Aichi (JP); Noriyuki Tajiri, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/654,975

(22) Filed: Sep. 5, 2000

Related U.S. Application Data

(62) Division of application No. 09/114,627, filed on Jul. 13, 1998, now abandoned, which is a continuation of application No. PCT/JP97/00032, filed on Jan. 10, 1997.

(30) Foreign Application Priority Data

Jan. 12, 1996 (JP) .............................. 8-020608
Jul. 31, 1996 (JP) .............................. 8-202100

(51) Int. Cl.$^7$ .............................. C08F 2/18; C08F 2/20; C08F 120/32; C08L 33/14
(52) U.S. Cl. .................... 525/327.3; 525/934; 526/202; 526/207; 526/218.1; 526/273
(58) Field of Search ................................ 526/273, 202, 526/207, 218.1; 525/934, 327.3

(56) References Cited

U.S. PATENT DOCUMENTS 4,081,592 A * 3/1978 Giddings et al. ........... 526/248
4,981,759 A * 1/1991 Nakatani et al. ........... 428/626
5,137,977 A * 8/1992 Saitoh et al. ............... 525/282
5,227,273 A * 7/1993 Yoshida et al. ............. 524/457
5,397,641 A * 3/1995 Moens et al. ............... 528/272

FOREIGN PATENT DOCUMENTS

DE    3448010 A * 2/1986
EP     256369 A * 2/1988
GB    1261427   * 1/1972

* cited by examiner

*Primary Examiner*—Robert E. L. Sellers
(74) *Attorney, Agent, or Firm*—Knobbe Martens Olson & Bear LLP

(57) ABSTRACT

An epoxy group-containing acrylic resin for a powder coating composition is a copolymer, having a weight-average molecular weight of 3000 to 20000, of a vinyl monomer mixture comprising 10 to 60% by weight of alkyl ester(s) of (meth)acrylic acid, 10 to 60% by weight of epoxy group-containing vinyl monomer(s) and other vinyl monomer(s), said epoxy group-containing acrylic resin having a mean particle diameter in the range of 80 to 800 µm, including 95% by weight or more of particles satisfying the relation of $1 \leq R/r \leq 1.2$ wherein R is a long diameter and r is a short diameter of each particle, and including 1000 ppm or less of volatile components, the amount of the particles having long diameters R of less than 62 µm being 5% by weight or less, that of the particles having short diameters r of more than 1000 µm being 5% by weight or less.

5 Claims, No Drawings

POWDER COATING COMPOSITION COMPRISING EPOXY GROUP-CONTAINING ACRYLIC RESIN

This application is a divisional of U.S. application Ser. No. 09/114,627, filed Jul. 13, 1998, abandoned, which is a continuation of international Application No. PCT/JP97/00032 filed on Jan. 10, 1997 which designates the United States pursuant to 35 U.S.C. §363.

TECHNICAL FIELD

The present invention relates to an acrylic resin for a powder coating composition and its preparation method.

BACKGROUND ART

Examples of coating compositions include a solvent type coating composition in which a pigment and a polymeric substance are dispersed in an organic solvent, a water-soluble type resin coating composition in which a water-soluble resin that can be insolubilized by heating is used, an emulsion coating composition in which a resin is dispersed in water, and a powder coating composition in which a resin is ground into powder, applied and then heated to form a coating film, but the solvent type coating composition has been mainly used from the viewpoints of the beauty of an obtained coating film, durability and the like.

In recent years, however, regulations for organic solvents become severe in view of problems such as air pollution and the danger of a fire, and much attention has been paid to solventless coating compositions. Above all, the powder coating compositions have been in the limelight from the viewpoint of environmental protection, and in particular, acrylic powder coating compositions are characterized by being excellent in a coating film performance such as weathering resistance. For this reason, it has been noticed to use these acrylic powder coating compositions for building materials and car parts, particularly for clear coatings for cars.

With regard to the powder coating composition, in order to form a smooth coating film, it is necessary to lower the molecular weight of a selected resin. For the sake of this realization, as preparation methods of the resin for the powder coating composition, there have been suggested bulk polymerization, solution polymerization, suspension polymerization and the like, but in fact, the solution polymerization method in which the molecular weight can be easily lowered is often employed (Japanese Patent Application Laid-Open No. 138437/1978).

However, in the solution polymerization method, a step of removing a used solvent is required, and for the removal of the solvent, the conditions of a high temperature and a reduced pressure are usually necessary, which is inconvenient in point of energy. In addition, a production process is prolonged, which inconveniently results in poor productivity. Furthermore, in the solution polymerization method, the resin is obtained in the state of masses, and in order to obtain the coating composition, a grinding step of the resin is necessary. However, when the resin is ground, fine powder is easily generated, and such fine powder is liable to fly about during handling, which easily makes an operating efficiency poor. Moreover, if the insufficiently ground resin is present, the mixing of the resin and a crosslinking agent is insufficient during the preparation of the powder coating composition, which causes a problem that the performance of the obtained coating film deteriorates. Furthermore, a method for preparing an acrylic resin for the powder coating composition by the bulk polymerization under solventless and catalyst-free conditions has been suggested in Japanese Patent Application Laid-Open No. 140395/1978, but also in this bulk polymerization, the grinding step of the resin is necessary, so that the bulk polymerization has the same problem as in the case of the solution polymerization.

On the other hand, the suspension polymerization has an advantage that the solvent removing step and the resin grinding step are unnecessary, but there is a tendency that the molecular weight of the obtained resin is very high. In consequence, the gloss and the smoothness of the formed coating film are inconveniently easily impaired. Thus, a mercaptan has heretofore been used as a chain transfer agent to lower the molecular weight. However, a powder coating composition comprising the resin obtained by the use of the mercaptan as the chain transfer agent is so odorous as to be impractical, and a formed coating film is apt to be poor in weathering resistance.

On the contrary, in Japanese Patent Application Laid-Open No. 158682/1975, it has been disclosed that for the purpose of obtaining a low-molecular weight vinyl polymer which is suitable for the powder coating composition and is less odorous by the suspension polymerization, α-methylstyrene and/or its dimer is used as the chain transfer agent and as an essential component.

However, a coating film formed from the vinyl polymer obtained in Japanese Patent Application Laid-Open No. 158682/1975 is still poor in coating film performance such as smoothness. Particularly, since a large amount of the chain transfer agent is used, a polymerization rate deteriorates, so that a polymerization step is prolonged. In consequence, the productivity of the resin is low, and when the resin is molten and kneaded at a high temperature in the preparation of the powder coating composition, an odor is given off owing the increased amount of the remaining monomer. In addition, during the formation of the coating film, vaporization of the remaining monomer occasionally causes the formation of pinholes in the coating film.

DISCLOSURE OF THE INVENTION

An object of the present invention is to provide a resin for a powder coating composition which is excellent in workability, productivity and coating film performances such as gloss and smoothness and which is free from the problems of an odor and pinholes.

Another object of the present invention is to provide a method for efficiently preparing the resin for the powder coating composition.

The present inventors have intensively investigated with the intention of achieving the above-mentioned objects, and as a result, it has been found that an epoxy group-containing acrylic resin having a specific particle shape and specific physical properties can achieve the above-mentioned objects, and in consequence, the present invention has been completed.

That is to say, the present invention is directed to an epoxy group-containing acrylic resin for a powder coating composition which is a copolymer, having a weight-average molecular weight of 3000 to 20000, of a vinyl monomer mixture comprising 10 to 60% by weight of alkyl ester(s) of (meth)acrylic acid, 10 to 60% by weight of an epoxy group-containing vinyl monomer(s) and other vinyl monomer(s), said epoxy group-containing acrylic resin having a mean particle diameter in the range of 80 to 800 µm, including 95% by weight or more of particles satisfying the relation of $1 \leq R/r \leq 1.2$ wherein R is a long diameter and r is a short diameter of each particle, the amount of the particles having long diameters R of less than 62 μm being 5% by weight or less, that of the particles having short diameters r of more than 1000 μm being 5% by weight or less, and including 1000 ppm or less of volatile components.

In the present invention, it is required that an epoxy group-containing acrylic resin, which can be used as a resin for a powder coating composition of the present invention, has a mean particle diameter in the range of 80 to 800 μm and includes 95% by weight or more of particles satisfying the relation of $1 \leq R/r \leq 1.2$ wherein R is a long diameter and r is a short diameter of each particle, and the amount of the particles having long diameters R of less than 62 μm is 5% by weight or less and that of the particles having short diameters r of more than 1000 μm is 5% by weight or less.

The reason why the mean particle diameter of the epoxy group-containing acrylic resin is 80 μm or more and the particles having long diameters R of less than 62 μm are present in an amount of 5% by weight or less is that fine powder does not fly about during the preparation of a coating composition, and the deterioration of a working environment and the decline in a yield of the coating composition can be prevented. Furthermore, the reason why the mean particle diameter is 800 μm or less and the particles having short diameters r of more than 1000 μm are present in an amount of 5% by weight or less is that the resin and a crosslinking agent can be uniformly mixed during a melting/kneading step in the preparation of the powder coating composition, so that the hardness of an obtained coating film can be improved. It is more preferable to satisfy conditions that the mean diameter is in the range of 100 to 700 μm; the amount of the particles having long diameters R of less than 62 μm is 2% by weight or less; and that of the particles having short diameters r of more than 1000 μm is 3% by weight or less.

Furthermore, the epoxy group-containing acrylic resin of the present invention is required to contain 95% by weight or more of the particles satisfying the relation of $1 \leq R/r \leq 1.2$. Because of this, the resin particles are scarcely ground during transportation and the like, so that fine powder which impairs handling properties is scarcely generated. In addition, the fluidity of the resin particles in a manufacturing apparatus is good during the preparation of the powder coating composition, and the feed of the resin can be smoothly carried out in the course of the melting/kneading of the resin and a curing agent, which leads to the improvement of workability. Moreover, the resin particles satisfying the relation of $1 \leq R/r \leq 1.2$ are preferably present in an amount of 98% by weight or more.

Furthermore, the amount of volatile components contained in the epoxy group-containing acrylic resin is required to be 1000 ppm or less. The reason why the amount of the volatile components is 1000 ppm or less is that the problem of an odor due to the remaining volatile components is not present in a melting/kneading step at a high temperature required for the preparation of the coating composition, and the generation of pinholes in a formed coating film can be reduced. The amount of the volatile components is more preferably 700 ppm or less. The volatile components referred to in the present invention mainly comprise the remaining monomers for use in the polymerization.

The weight-average molecular weight of the epoxy group-containing acrylic resin is in the range of 3000 to 20000. The reason why the weight-average molecular weight is 3000 or more is that a sufficient coating film hardness can be obtained, and the reason why it is 20000 or less is that the surface of the coating film is excellent in smoothness. The weight-average molecular weight of the epoxy group-containing acrylic resin is more preferably in the range of 5000 to 15000, most preferably 6000 to 12000.

The epoxy group-containing acrylic resin of the present invention can be obtained by copolymerizing a vinyl monomer mixture comprising 10 to 60% by weight of alkyl ester(s) of (meth)acrylic acid, 10 to 60% by weight of epoxy group-containing vinyl monomer(s) and other vinyl monomer(s).

Examples of the alkyl ester of (meth)acrylic acid which can be used herein include methyl (meth)acrylate, ethyl (meth)acrylate, propyl (meth)acrylate, n-butyl (meth)acrylate, iso-butyl (meth)acrylate, tert-butyl (meth)acrylate, sec-butyl (meth)acrylate, n-pentyl (meth)acrylate, lauryl (meth)acrylate, tridecyl (meth)acrylate, 2-ethylhexyl (meth)acrylate, stearyl (meth)acrylate and cyclohexyl (meth)acrylate. They can be used singly or in a combination of two or more thereof in compliance with a use purpose. The alkyl ester of (meth)acrylic acid is preferably used in an amount of 10 to 60% by weight in the vinyl monomer mixture.

Examples of the above-mentioned epoxy group-containing vinyl monomer include glycidyl (meth)acrylate, methylglycidyl (meth)acrylate, 3,4-epoxycyclohexylmethyl (meth)acrylate and allyl glycidyl ether. They can be used singly or in a combination of two or more thereof in compliance with a use purpose. Above all, glycidyl (meth)acrylate is preferable. The epoxy group-containing vinyl monomer is preferably used in an amount of 10 to 60% by weight in the vinyl monomer mixture and in such an amount that an epoxy equivalent of the obtained acrylic resin may be within the range of 350 to 1200 g/eq. This is because if the epoxy equivalent is 350 g/eq. or more, the obtained coating film is excellent in smoothness and storage stability, and if it is 1200 g/eq. or less, the obtained coating film is excellent in hardness and solvent resistance.

Incidentally, the epoxy equivalent referred to herein is a gram number of the resin necessary to obtain 1 mol of the epoxy group.

Furthermore, examples of the above-mentioned other vinyl monomer include hydroxyalkyl esters of (meth)acrylic acid such as 2-hydroxyethyl (meth)acrylate, 2-hydroxypropyl (meth)acrylate and 4-hydroxybutyl (meth)acrylate; styrene monomers such as styrene, o-methylstyrene, m-methylstyrene, p-methylstyrene, α-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-phenylstyrene and 3,4-dicyclohexylstyrene; and dialkyl esters of unsaturated aliphatic dibasic acids such as dimethyl maleate, diethyl maleate, dibutyl maleate, dimethyl fumarate, diethyl fumarate and dibutyl fumarate. They can be used singly or in a combination of two or more thereof in compliance with a use purpose.

Above all, the styrene monomers and the hydroxyalkyl esters of (meth)acrylic acid are preferable, and the styrene monomers are particularly preferable, and among the styrene monomers, styrene is particularly preferable.

In the case that the styrene monomer is selected, this monomer is preferably used in the range of 10 to 50% by weight in the vinyl monomer mixture. This is because if the amount of the styrene monomer to be used is 10% by weight or more, the storage stability of the obtained powder coating composition and the smoothness of the obtained coating film are excellent, and if that of the styrene monomer is 50% by weight or less, the impact resistance and the weathering resistance of the obtained coating film is excellent. The amount of the styrene monomer to be used is more preferably in the range of 10 to 40% by weight.

Furthermore, since the hydroxyalkyl ester of (meth) acrylic acid can improve a crosslinking acceleration effect and adhesive properties to a coating plate, the hydroxyalkyl ester is preferably used as the other vinyl monomer singly or together with the styrene monomer, and the latter case is particularly preferable.

The hydroxyalkyl ester of (meth)acrylic acid is preferably used in the range of 0.5 to 50% by weight in the vinyl monomer mixture. This is because if the amount of the hydroxyalkyl ester of (meth)acrylic acid to be used is 0.5% by weight or more, the hardness and the solvent resistance of the obtained coating film, and the adhesive properties to the coating plate are excellent. And if that of the hydroxyalkyl ester of (meth)acrylic acid is 50% by weight or less, the water resistance and the pollution resistance of the obtained coating film are apt to be excellent. The amount of the hydroxyalkyl ester of (meth)acrylic acid to be used is more preferably in the range of 3 to 40% by weight.

A copolymerization ratio of the vinyl monomer constituting the epoxy group-containing acrylic resin of the present invention is preferably such that the amount of the monomer to be used are within the above-mentioned ranges and a glass transition temperature of the epoxy group-containing acrylic resin is 40° C. or more. This is because if the glass transition temperature of the epoxy group-containing acrylic resin is 40° C. or more, the storage stability of the obtained powder coating composition is good. The glass transition temperature of the epoxy group-containing acrylic resin is more preferably in the range of 40 to 70° C. The reason why the glass transition temperature is 70° C. or less is that coating film properties, particularly impact resistance is good.

Furthermore, a copolymerization ratio and a molecular weight of the epoxy group-containing acrylic resin of the present invention are preferably regulated such that its softening point is in the range of 80 to 150° C. This is because if the softening point is 80° C. or more, the coating film hardness is good. And if the softening point is 150° C. or less, the smoothness of the coating film is apt to be good.

As a polymerization method of the epoxy group-containing acrylic resin of the present invention, a suspension polymerization method can be preferably used. This is because if the suspension polymerization method is used, the particles having a specific particle diameter of the present invention can easily be obtained, and the productivity is high. In the case that the suspension polymerization method is applied, the resin for the powder coating composition of the present invention can be obtained only by separating a polymer solid from a dispersion medium such as water by filtration after the polymerization. Moreover, when the resin is prepared by the suspension polymerization method, the resin of the spherical particles can be obtained. The resin of the spherical particles has an advantage in that even if the resin suffers from impact during transportation and the like, the resin is scarcely ground, because stress is easily dispersed.

On the contrary, in the case that a solution polymerization method or a bulk polymerization method is used, the obtained mass-like resin is required to be ground, and when it has been actually ground, a particle diameter distribution easily becomes broad, which makes the control of the particle diameter intricate. Moreover, the shape of each particle is a polyhedron having sharp tips, and therefore, there is a drawback that when these particles have received the impact during the transportation or the like, the stress gathers at the tip to readily crush the particles, so that fine powder is readily generated.

In the case that the epoxy group-containing acrylic resin of the present invention is obtained by the suspension polymerization method, a polymerization initiator, a chain transfer agent, a dispersant and the like can be suitably selected and used in compliance with a use purpose. In order to obtain the resin within the above-mentioned ranges of the volatile components and the weight-average molecular weight, an azo compound is preferably used as the polymerization initiator, and the use of both the azo compound and an organic peroxide having no benzene ring is most preferable. By using the azo compound as the polymerization initiator, it can be easily achieved to lower the molecular weight of the obtained resin, and by using both the azo compound and the organic peroxide having no benzene ring, a polymerization ratio (a reaction ratio) of the obtained resin can be heightened to efficiently decrease the amount of the remaining monomers for the polymerization. When an organic peroxide having a benzene ring such as benzoyl peroxide is used in the combination, benzoic acid is secondarily produced during the polymerization, and it reacts with a simultaneously existing epoxy group, whereby the ring of the epoxy group is opened and crosslinked, and in consequence, the molecular weight of the obtained polymer is increased. In addition, this reaction consumes the epoxy group, whereby the crosslinkage between the acrylic resin and the curing agent during the formation of the coating film is insufficient, so that the smoothness and the hardness of the coating film deteriorate on occasion. For these reasons, as the organic peroxide, that having no benzene ring is preferable.

No particular restriction is put on a kind of azo compound which can be used as the polymerization initiator, so long as it is the azo compound which can be used as the polymerization initiator for the usual suspension polymerization, but it is more preferable to use both of one or more of the azo compounds having a 10-hour half-life temperature of less than 60° C. and one or more of the azo compounds having a 10-hour half-life temperature of 60° C. or more. This is because the use of the azo compound having a 10-hour half-life temperature of less than 60° C. can lower the molecular weight of the obtained polymer. And the use of the azo compound having a 10-hour half-life temperature of more than 60° C. as an auxiliary polymerization initiator can heighten the polymerization ratio (the reaction ratio) of the obtained resin to decrease the amount of the remaining monomers after the polymerization.

As the azo compounds having a 10-hour half-life temperature of less than 60° C., compounds having 10-hour half-life temperatures of not less than 30° C. and less than 60° C. are preferable, and compounds having 10-hour half-life temperatures of not less than 40° C. and less than 60° C. are more preferable. One example of such a compound is 2,2'-azobis-2,4-dimethylvaleronitrile (52° C.) (the figure in the parentheses represents the 10-hour half-life temperature, and the same shall apply hereinafter).

As the azo compounds having a 10-hour half-life temperature of 60° C. or more, compounds having 10-hour half-life temperatures of 60° C. to 120° C. are preferable, and compounds having 10-hour half-life temperatures of 60° C. to 100° C. are more preferable. Examples of such compounds include 2,2'-azobisisobutyronitrile (65° C.), 2,2'-azobis-2-methylbutyronitrile (67° C.) and 1,1'-azobis-1-cyclohexanecarbonitrile (87° C.).

The amount of the azo compound to be used is preferably in the range of 0.1 to 10 parts by weight based on 100 parts by weight of the vinyl monomer mixture. This is because if the amount of the azo compound is 0.1 part by weight or more, the molecular weight of the obtained epoxy group-containing acrylic resin can be sufficiently lowered, whereby the powder coating composition having the excellent film coating smoothness can be obtained. And the reason why the amount of the azo compound is 10 parts by weight or less is that even if the azo compound is used in an amount of more than 10 parts by weight, the effect of lowering the molecular weight is not observed any more. The amount of the azo compound to be used is more preferably in the range of 0.5 to 10 parts by weight.

Furthermore, the organic peroxide having no benzene ring which can be used together with the above-mentioned azo compound preferably has a 10-hour half-life temperature of 120° C. or less. This is because the use of the organic peroxide having a 10-hour half-life temperature of 120° C. or less can achieve further reduction of the amount of the remaining monomers. Practically, the organic peroxide having a 10-hour half-life temperature of 60° C. or more is preferable, and the organic peroxide having a 10-hour half-life temperature of 80° C. or more is more preferable.

Examples of the organic peroxide having no benzene ring which can be used in the present invention include t-butylperoxyisopropyl carbonate (98° C.) (the figure in the parentheses represents the 10-hour half-life temperature, and the same shall apply hereinafter), t-butylperoxy-2-ethylhexanoate (73°) and lauroyl peroxide (62° C.). The amount of the organic peroxide to be used is preferably in the range of 0.1 to 5 parts by weight based on 100 parts by weight of the vinyl monomer mixture. This is because if the amount of the organic peroxide is 0.1 part by weight or more, the effect of reducing the amount of the remaining monomers is sufficient. And the reason why the amount of the organic peroxide is 5 parts by weight or less is that even if the organic peroxide is used in an amount of more than 5 parts by weight, the amount of the remaining monomers does not change any more. The amount of the organic peroxide is more preferably in the range of 0.3 to 5 parts by weight.

In order to obtain the resin for the powder coating composition within the above-mentioned ranges of the volatile components and the weight-average molecular weight, the chain transfer agent can be used together with the above-mentioned polymerization initiator. Examples of the chain transfer agent which can be used in the present invention include α-methylstyrene dimer, terpinolene (1-methyl-4-isopropylidene-1-cyclohexene), n-octyl mercaptan, n-dodecyl mercaptan and 2-ethylhexyl thioglycolate. They can be used singly or in a combination of two or more thereof in compliance with a use purpose. Above all, α-methylstyrene dimer and terpinolene are preferable. Particularly, the use of terpinolene as the chain transfer agent permits obtaining the resin for the powder coating composition in which the molecular weight of the polymer is lowered and so the smoothness of the coating film is excellent, and the odor of the obtained resin can be reduced.

Here, the amount of terpinolene to be used is preferably in the range of 0.1 to 5 parts by weight based on 100 parts by weight of the vinyl monomer mixture. This is because if the amount of terpinolene is 0.1 or more, the effect of terpinolene as the chain transfer agent can be sufficiently exerted, and therefore the increase in the molecular weight of the obtained polymer can be prevented and the smoothness of the coating film can be improved. On the other hand, if terpinolene is used in an excessive amount, a polymerization rate deteriorates, and the amount of the remaining monomers tends to increase, so that the productivity declines and the problem of the odor due to the remaining monomers may arise during the melting/kneading step. However, when the amount of terpinolene is set to 5 parts by weight or less, these problems can be prevented. The amount of terpinolene is more preferably in the range of 0.2 to 3 parts by weight.

In the case that the chain transfer agent other than terpinolene is used in the suspension polymerization, the amount of the chain transfer agent to be added is preferably in the range of 0.1 to 10 parts by weight based on 100 parts by weight of the vinyl monomer mixture. When the amount of the chain transfer agent is 0.1 part by weight or more, the effect of the chain transfer agent can sufficiently appear, but when the amount thereof is too much, the polymerization rate deteriorates and the amount of the remaining monomers increases as in the case of terpinolene. In practice, the amount of the chain transfer agent is preferably 10 parts by weight or less, more preferably in the range of 0.5 to 8 parts by weight.

However, in the case that a mercaptan is used as the chain transfer agent to be used together, the problem of the odor of the resin may arise, and the weathering resistance of the coating film also tends to be poor. Accordingly, the amount of the mercaptan to be added is preferably 0.2 part by weight or less, and in this case, the adjustment of the molecular weight is suitably carried out by using another chain transfer agent together.

Examples of a dispersant which can be used for the suspension polymerization in the present invention include polyvinyl alcohol, alkali metal salts of homopolymers and copolymers of (meth)acrylic acid, carboxymethyl cellulose, gelatin, starch, barium sulfate, calcium sulfate, calcium carbonate, magnesium carbonate and calcium phosphate. The dispersant is preferably used in the range of 0.01 to 5 parts by weight based on 100 parts by weight of water. This is because if the amount of the dispersant is 0.01 part by weight or more, the stability improvement effect of the suspension polymerization can be obtained. And if it is 5 parts by weight or less, the particle diameter of the formed particles after the polymerization becomes not too fine, so that a waste water can be prevented from being polluted therewith, and the productivity is high. The amount of the dispersant to be used is more preferably in the range of 0.05 to 2 parts by weight. If necessary, a dispersing agent such as sodium chloride, potassium chloride, sodium sulfate, potassium sulfate and manganese sulfate can also be used together with the above-mentioned dispersant.

The suspension polymerization can be carried out by adding, to the vinyl monomer mixture, the polymerization initiator, the chain transfer agent, the dispersant and if necessary, the dispersing agent together with water in an amount preferably 1 to 10 times, more preferably 1.3 to 4 times as much as the vinyl monomer mixture, heating the mixture up to a predetermined polymerization temperature at a predetermined rate, and then continuing the heating until completion of the polymerization.

Furthermore, in the present invention, the suspension polymerization is done under conditions that a polymerization temperature is 80° C. or more and preferably 180° C. or less and a polymerization pressure is 2 kg/cm$^2$ or more and preferably 10 kg/cm$^2$ or less. The reason why the polymerization temperature is 80° C. or more and the polymerization pressure is 2 kg/cm$^2$ or more is that the molecular weight of the obtained epoxy group-containing acrylic resin can be sufficiently lowered and the resin for the powder coating composition which is excellent in the smoothness of the coating film can be obtained. The polymerization temperature is more preferably 100° C. or more and 150° C. or less, and the polymerization pressure is more preferably 3 kg/cm² or more and 8 kg/cm² or less.

The volatile components in the epoxy group-containing acrylic resin obtained by the above-mentioned suspension polymerization can be easily reduced to 1000 ppm or less by carrying out a removal operation of the volatile components. These volatile components, particularly the remaining monomers can be removed by heating the system at the end of the polymerization to distill off the monomers, or distilling the suspension after the polymerization to distill off the remaining monomers. In this case, it is not always necessary to distill off all of the dispersion medium comprising water and the like, and by distilling off a part of the dispersion medium, most of the remaining monomers can be simultaneously removed. As the removal operation of the volatile components, a method of distilling the suspension after the polymerization under atmospheric pressure or reduced pressure is particularly preferable.

In the case that the epoxy group-containing acrylic resin of the present invention is obtained by the suspension polymerization, the particle diameter of the resin depends on conditions regarding a reaction apparatus such as a reaction vessel and the shape of stirring blades, and polymerization conditions such as a stirring rotational frequency, kinds and amounts of dispersant and dispersing agent, and a ratio between the monomers and water. In the present invention, these conditions are taken into consideration to decide a manufacturing prescription, whereby the epoxy group-containing acrylic resin having a desired shape intended by the present invention can be obtained.

The epoxy group-containing acrylic resin of the present invention can be used as the coating composition after it has been blended with a curing agent. Examples of the usable curing agent include polyvalent carboxylic acids and polyvalent phenols. The amount of the curing agent to be used is within such a range that an equivalent ratio of the epoxy group of the epoxy group-containing acrylic resin to a functional group such as a carboxyl group or a phenolic hydroxyl group of the curing agent is in the range of 1/2 to 2/1, preferably 1/1. The reason why the equivalent ratio is 1/2 or more is that the coating film having a sufficient water resistance can be obtained, and on the other hand, the reason why it is 2/1 or less is that a sufficient solvent resistance can be obtained.

The powder coating composition comprising the epoxy group-containing acrylic resin of the present invention can be used as the coating composition for various materials to be coated such as metals, glasses and heat-resistant plastics.

A baking temperature of the material to be coated can be suitably selected in accordance with a kind of the material to be coated and a use purpose, but for example, the baking temperature is in the range of 120 to 250° C., and a baking time is in the range of 5 to 30 minutes.

BEST MODE FOR CARRYING OUT THE INVENTION

Next, the present invention will be described in more detail with reference to examples. In examples and comparative examples, part(s) means part(s) by weight.

Various physical properties in the examples and the comparative examples were evaluated by the following procedures.

(1) Mean particle diameter:

In accordance with a dry sieve analysis method stipulated by JIS K-0069, a wire sieve having an inner diameter of 75 mm stipulated by JIS Z-8801 was used, and 5 g of a sample was put into a set sieve in which wire sieves having mesh openings of 1000 $\mu$m, 710 $\mu$m, 500 $\mu$m, 355 $\mu$m, 250 $\mu$m, 150 $\mu$m and 75 $\mu$m, and a pan were stacked in this order from the top. A lid was then put on the set sieve, followed by shaking, to determine the residues of the sample on the respective sieves. On the basis of the display of an integrated distribution, the mesh opening through 50% by weight of the resin was passed was determined.

(2) Ratio of the resin having long diameters of less than 62 $\mu$m and that having short diameters of more than 1000 $\mu$m:

In accordance with a dry sieve analysis method stipulated by JIS K-0069, a wire sieve having an inner diameter of 75 mm stipulated by JIS Z-8801 was used, and 5 g of a sample was put into a set sieve in which wire sieves having mesh openings of 1000 $\mu$m and 62 $\mu$m, and a pan were stacked in this order from the top. A lid was then put on the set sieve, followed by shaking, and a ratio of the resin on the pan was regarded as a ratio of the resin having long diameters of less than 62 $\mu$m, a weight ratio of the residue on the wire sieve of 1000 $\mu$m was regarded as a ratio of the resin having short diameters of more than 1000 $\mu$m.

(3) Shape of particles:

The shape of randomly selected 100 particles of the resin was observed by the use of a microscope to measure a short diameter r and a long diameter R of each resin particle, and an existing ratio of the resin particles in which a ratio R/r was within the range of $1 \leq R/r \leq 1.2$ was determined on the basis of the number of the resin particles within the above-mentioned range.

(4) Glass transition temperature:

A sample was heated up to 100° C. and melt quench was then carried out, and an extrapolation glass transition start temperature was measured by a DSC method (a differential scanning calorie measurement method, temperature rise rate=10° C./min). This extrapolation glass transition start temperature was employed as the glass transition temperature.

(5) Softening temperature:

Measurement was made by the use of a flow tester (CFT-500 model, made by Shimadzu Seisakusho Ltd.) under conditions of a temperature rise rate=3° C./min, a load=30 kgf, a nozzle diameter=1 mm$\Phi$ (diameter), a nozzle length= 10 mm, the sectional area of a plunger=1 cm² and a sample amount=1 g, and a temperature at which ½ of the sample flowed out was employed as the softening temperature.

(6) Weight-average molecular weight:

The weight-average molecular weight was measured by a gel permeation chromatography (GPC) method. A sample was a THF solution obtained by dissolving 0.4 part by weight of the resin in 100 parts by weight of tetrahydrofuran. This sample was filtered through a PTFE film having a pore diameter of 0.5 $\mu$m (Myshoridisc H-25-5, made by Toso Co., Ltd.), and measurement was then made by HCL-8020 (made by Toso Co., Ltd.) constituted of three TSKgel/GMH$_{HL}$ columns (made by Toso Co., Ltd.). By the use of a calibration curve of F2000/F700/F288/F128/F80/F40/F20/F2/ A1000 (polystyrene made by Toso Co., Ltd.) and a styrene monomer, the weight-average molecular weight was determined in terms of polystyrene. In this case, the measurement was made at 38° C., and RI was used as a detector.

(7) Amount of volatile components:

Remaining monomers in the resin were measured by gas chromatography (GC-8A, made by Shimadzu Seisakusho Ltd.), and the thus measured total amount was regarded as the amount of the volatile components.

(8) Epoxy equivalent:

The epoxy equivalent was measured in accordance with JIS K-7236 by an indicator titration method. A sample having 0.0006 to 0.0009 epoxy equivalent was dissolved in 10 ml of chloroform and 20 ml of acetic acid. Furthermore, to this solution, 10 ml of an acetic acid solution of tetraethylammonium bromide was added, and titration is then carried out with a 0.1 N acetic acid perchlorate solution by the use of crystal violet as an indicator. On the basis of the amount of the consumed 0.1 N acetic acid perchlorate solution, the epoxy equivalent was determined.

(9) Smoothness:

The smoothness was evaluated on the basis of the following standards by visually observing the surface of each coating film:

⊚: Very good

○: Good

Δ: Slightly bad

×: Bad

(10) Hardness:

Evaluation was made by a pencil scratching method for the coating film in accordance with JIS K-5400, and the hardness was represented by the hardest pencil by which the coating film was not scratched.

(11) Impact resistance:

A weight of 500 g was dropped on the coating film in accordance with JIS K-5400, and a maximum height at which the surface of the coating film did not crack was measured. The thus measured value was regarded as the impact resistance.

(12) Odor at high-temperature melding:

In a container with a lid, 10 g of the dried resin was heated for 1 hour in an electric furnace at 100° C., and the lid was taken off. At this time, the odor generated from the resin was evaluated on the basis of the following standards:

⊚: No odor, or it was so weak that the resin was at a sufficiently practical level ○: Slightly odorous, but the resin was at the practical level ×: Strongly odorous, and the resin was not at the practical level

(13) Pinholes:

The surface of the coating film was visually observed, and evaluation was made on the basis of the following standards:

○: No pinholes, and the resin was at a practical level

Δ: Some pinholes were observed, and the resin was slightly below the practical level ×: Many pinholes were observed, and the resin was noticeably below the practical level

(14) Adhesive properties to a coating plate:

The coating film was cut in the grid state of 1 $mm^2$ cubes in a range of 1 $cm^2$, and an adhesive tape was stuck on the cut surface and then peeled off. The state of the coating film after the peeling of the tape was evaluated on the basis of the following standards:

⊚: Any peeling of the coating film was not observed, and the adhesive properties to the coating plate was good.

○: The peeling of the coating film was scarcely observed, and the resin was at a practical level.

Δ: The peeling of the coating film was slightly observed, and the resin was below the practical level.

×: The coating film was peeled off all over, and the resin was noticeably below the practical level.

EXAMPLE 1

A solution obtained by sufficiently dissolving 0.005 part of manganese sulfate and 0.225 part of polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 5 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries) and 3 parts of α-methylstyrene dimer (Nofmer MSD, made by Nippon Oils & Fats Co., Ltd.), and suspension polymerization was then carried out at 110° C. for 2 hours in a closed system to obtain a suspension polymer. During the polymerization, a pressure in the reaction vessel was 4.6 $kg/cm^2$.

Next, this suspension polymer was distilled under atmospheric pressure for 2 hours, so that a distillate substantially comprising water was allowed to drip out up to the amount of 20% of the fed deionized water. Thus the residual monomers were removed. After cooled to 40° C., the obtained polymer was sufficiently washed with water, and then dried to obtain an epoxy group-containing acrylic resin having a mean particle diameter of 420 μm. The thus obtained resin was free from any residual odor, and its particles had a substantially spherical shape.

Table 1 shows the evaluation results of the characteristics of the obtained resin.

Next, 80 parts of this resin and 20 parts of a curing agent (dodecanedicarboxylic acid) were molten and kneaded at a temperature of 100° C. for 30 minutes, and an aluminum plate was coated with the resultant mixture in a known manner and then baked at 180° C. for 20 minutes to obtain a coated plate having a coating film of 80 μm in thickness. The evaluation results about the coating film of the thus obtained coated plate are shown in Table 1. During the formation of a coating composition, any fine powder did not fly about, and the performance of the coating film was good.

EXAMPLE 2

A solution obtained by sufficiently dissolving 0.005 part of manganese sulfate and 0.225 part of polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 38 parts of styrene, 32 parts of methyl methacrylate, 15 parts of n-butyl acrylate, 15 parts of glycidyl methacrylate, 2 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries) and 3 parts of α-methylstyrene dimer (Nofmer MSD, made by Nippon Oils & Fats Co., Ltd.), and suspension polymerization was then carried out at 130° C. for 2 hours in a closed system to obtain a suspension polymer. During the polymerization, a pressure in the reaction vessel was 4.3 $kg/cm^2$.

Next, a distillation operation was carried out in the same manner as in Example 1 to obtain an epoxy group-containing acrylic resin having a mean particle diameter of 360 μm. The thus obtained resin was free from any residual odor, and its particles had a substantially spherical shape.

Table 1 shows the evaluation results of the characteristics of the obtained resin.

Next, 89 parts of this resin were blended with 11 parts of a curing agent (dodecanedicarboxylic acid), and the same procedure as in Example 1 was then repeated to obtain a baked and coated plate. The evaluation results about the coating film of the thus obtained coated plate are shown in Table 1. During the formation of a coating composition, any fine powder did not fly about, and the performance of the coating film was good.

EXAMPLE 3

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 5 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries) and 3 parts of terpinolene (Terpinolene, made by Yasuhara Chemical Co., Ltd.), and suspension polymerization was then carried out at 110° C. for 2 hours in a closed system to obtain a suspension polymer. During the polymerization, a pressure in the reaction vessel was 4.8 kg/cm$^2$.

Afterward, a distillation operation was carried out in the same manner as in Example 1 to obtain an epoxy group-containing acrylic resin having a mean particle diameter of 420 μm. The thus obtained resin was free from any residual odor, and its particles had a substantially spherical shape.

Table 1 shows the evaluation results of the characteristics of the obtained resin.

Next, 80 parts of this resin were blended with 20 parts of a curing agent (dodecanedicarboxylic acid), and the same procedure as in Example 1 was then repeated to obtain a baked and coated plate. The evaluation results about the coating film of the thus obtained coated plate are shown in Table 1. During the formation of a coating composition, any fine powder did not fly about, and the performance of the coating film was good.

EXAMPLE 4

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 5 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 1 part of terpinolene (Terpinolene, made by Yasuhara Chemical Co., Ltd.), and 3 part of α-methylstyrene dimer (Nofmer MSD, made by Nippon Oils & Fats Co., Ltd.), and suspension polymerization was then carried out at 110° C. for 2 hours in a closed system to obtain a suspension polymer. During the polymerization, a pressure in the reaction vessel was 4.5 kg/cm$^2$.

Afterward, a distillation operation was carried out in the same manner as in Example 1 to obtain an epoxy group-containing acrylic resin having a mean particle diameter of 450 μm. The thus obtained resin was free from any residual odor, and its particles had a substantially spherical shape.

Table 1 shows the evaluation results of the characteristics of the obtained resin.

Next, 80 parts of this resin were blended with 20 parts of a curing agent (dodecanedicarboxylic acid), and the same procedure as in Example 1 was then repeated to obtain a baked and coated plate. The evaluation results about the coating film of the thus obtained coated plate are shown in Table 1. During the formation of a coating composition, any fine powder did not fly about, and the performance of the coating film was good.

EXAMPLE 5

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 6 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.), 3 parts of α-methylstyrene dimer (Nofmer MSD, made by Nippon Oils & Fats Co., Ltd.) and 0.5 part of terpinolene (Terpinolene, made by Yasuhara Chemical Co., Ltd.), and suspension polymerization was then carried out at 110° C. for 2 hours in a closed system to obtain a suspension polymer. During the polymerization, a pressure in the reaction vessel was 4.4 kg/cm$^2$.

Next, this suspension polymer was distilled under atmospheric pressure for 1.5 hours, so that a distillate substantially comprising water was allowed to drip out up to an amount of 10% of the fed deionized water. Thus, the residual monomers were removed. After cooled to 40° C., the obtained polymer was sufficiently washed with water, and then dried to obtain an epoxy group-containing acrylic resin having a mean particle diameter of 400 μm. The thus obtained resin was free from any residual odor, and its particles had a substantially spherical shape.

Table 1 shows the evaluation results of the characteristics of the obtained resin.

Next, 80 parts of this resin were blended with 20 parts of a curing agent (dodecanedicarboxylic acid), and the same procedure as in Example 1 was then repeated to obtain a baked and coated plate. The evaluation results about the coating film of the thus obtained coated plate are shown in Table 1. During the formation of a coating composition, any fine powder did not fly about, and the performance of the coating film was good.

EXAMPLE 6

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 38 parts of styrene, 32 parts of methyl methacrylate, 15 parts of n-butyl methacrylate, 15 parts of glycidyl methacrylate, 2 parts of 2,2'-azobis-2,4- dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.) and 3 parts of α-methylstyrene dimer (Nofmer MSD, made by Nippon Oils & Fats Co., Ltd.), and suspension polymerization was then carried out at 130° C. for 2 hours in a closed system to obtain a suspension polymer. During the polymerization, a pressure in the reaction vessel was 4.3 kg/cm$^2$.

Afterward, a distillation operation was carried out in the same manner as in Example 5 to obtain a resin for a powder coating composition comprising an epoxy group-containing acrylic resin having a mean particle diameter of 370 μm. The thus obtained resin was free from any residual odor, and its particles had a substantially spherical shape.

Table 1 shows the evaluation results of the characteristics of the obtained resin.

Next, 89 parts of this resin were blended with 11 parts of a curing agent (dodecanedicarboxylic acid), and the same procedure as in Example 1 was then repeated to obtain a baked and coated plate. The evaluation results about the coating film of the thus obtained coated plate are shown in Table 1. During the formation of a coating composition, any fine powder did not fly about, and the performance of the coating film was good.

EXAMPLE 7

A solution obtained by sufficiently dissolving 0.005 part of manganese sulfate, 0.07 part of a polyvinyl alcohol, the 4% aqueous solution of which has a viscosity of 25 cps at 20° C. (PA-18, made by The Shin-Etsu Chemical Co., Ltd.), and 0.07 part of a polyvinyl alcohol, the 4% aqueous solution of which has a viscosity of 30 cps at 20° C. (C-17, made by The Shin-Etsu Chemical Co., Ltd.), in 180 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 6 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.), 3 parts of α-methylstyrene dimer (Nofmer MSD, made by Nippon Oils & Fats Co., Ltd.) and 0.5 part of terpinolene (Terpinolene, made by Yasuhara Chemical Co., Ltd.), and suspension polymerization was then carried out at 110° C. for 3 hours in a closed system to obtain a suspension polymer. During the polymerization, a pressure in the reaction vessel was 4.4 kg/cm$^2$.

Afterward, a distillation operation was carried out in the same manner as in Example 5 to obtain an epoxy group-containing acrylic resin. The thus obtained resin was free from any residual odor, and its particles had a substantially spherical shape.

Table 1 shows the evaluation results of the characteristics of the obtained resin.

Furthermore, 80 parts of this resin were blended with 20 parts of a curing agent (dodecanedicarboxylic acid), and the same procedure as in Example 1 was then repeated to obtain a baked and coated plate. The evaluation results about the coating film of the thus obtained coated plate are shown in Table 1. During the formation of a coating composition, any fine powder did not fly about, and the performance of the coating film was good.

EXAMPLE 8

A solution obtained by sufficiently dissolving 0.005 part of manganese sulfate, 0.07 part of a polyvinyl alcohol, the 4% aqueous solution of which has a viscosity of 25 cps at 20° C. (PA-18, made by The Shin-Etsu Chemical Co., Ltd.), and 0.07 part of a polyvinyl alcohol, the 4% aqueous solution of which has a viscosity of 30 cps at 20° C. (C-17, made by The Shin-Etsu Chemical Co., Ltd.), in 180 parts of deionized water was poured into a reaction vessel. Next, to this reaction vessel, there was added a mixture of 38 parts of styrene, 32 parts of methyl methacrylate, 15 parts of n-butyl methacrylate, 15 parts of glycidyl methacrylate, 2 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.) and 3 parts of α-methylstyrene dimer (Nofmer MSD, made by Nippon Oils & Fats Co., Ltd.), and suspension polymerization was then carried out at 130° C. for 2 hours in a closed system to obtain a suspension polymer. During the polymerization, a pressure in the reaction vessel was 4.3 kg/cm$^2$.

Afterward, a distillation operation was carried out in the same manner as in Example 5 to obtain an epoxy group-containing acrylic resin. The thus obtained resin was free from any residual odor, and its particles had a substantially spherical shape.

Table 1 shows the evaluation results of the characteristics of the obtained resin.

Furthermore, 89 parts of this resin were blended with 11 parts of a curing agent (dodecanedicarboxylic acid), and the same procedure as in Example 1 was then repeated to obtain a baked and coated plate. The evaluation results about a coating film of the thus obtained coated plate are shown in Table 1. During the formation of a coating composition, any fine powder did not fly about, and the performance of the coating film was good.

EXAMPLE 9

A solution obtained by sufficiently dissolving 0.005 part of manganese sulfate, 0.08 part of a polyvinyl alcohol, the 4% aqueous solution of which has a viscosity of 25 cps at 20° C. (PA-18, made by The Shin-Etsu Chemical Co., Ltd.), and 0.08 part of a polyvinyl alcohol, the 4% aqueous solution of which has a viscosity of 30 cps at 20° C. (C-17, made by The Shin-Etsu Chemical Co., Ltd.), in 180 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 6 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.), 3 parts of α-methylstyrene dimer (Nofmer MSD, made by Nippon Oils & Fats Co., Ltd.) and 0.5 part of terpinolene (Terpinolene, made by Yasuhara Chemical Co., Ltd.), and suspension polymerization was then carried out at 110° C. for 3 hours in a closed system to obtain a suspension polymer. During the polymerization, a pressure in the reaction vessel was 4.4 kg/cm$^2$.

Afterward, a distillation operation was carried out in the same manner as in Example 5 to obtain an epoxy group-containing acrylic resin. The thus obtained resin was free from any residual odor, and its particles had a substantially spherical shape.

Table 1 shows the evaluation results of the characteristics of the obtained resin.

Furthermore, 80 parts of this resin were blended with 20 parts of a curing agent (dodecanedicarboxylic acid), and the same procedure as in Example 1 was then repeated to obtain a baked and coated plate. The evaluation results about a coating film of the thus obtained coated plate are shown in Table 1. During the formation of a coating composition, any fine powder did not fly about, and the performance of the coating film was good.

EXAMPLE 10

A solution obtained by sufficiently dissolving 0.005 part of manganese sulfate, 0.08 part of a polyvinyl alcohol, the 4% aqueous solution of which has a viscosity of 25 cps at 20° C. (PA-18, made by The Shin-Etsu Chemical Co., Ltd.), and 0.08 part of a polyvinyl alcohol, the 4% aqueous solution of which has a viscosity of 30 cps at 20° C. (C-17, made by The Shin-Etsu Chemical Co., Ltd.), in 180 parts of deionized water was poured into a reaction vessel. Next, to this reaction vessel, there was added a mixture of 38 parts of styrene, 32 parts of methyl methacrylate, 15 parts of n-butyl methacrylate, 15 parts of glycidyl methacrylate, 2 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.) and 3 parts of α-methylstyrene dimer (Nofmer MSD, made by Nippon Oils & Fats Co., Ltd.), and suspension polymerization was then carried out at 130° C. for 2 hours in a closed system to obtain a suspension polymer. During the polymerization, a pressure in the reaction vessel was 4.3 kg/cm$^2$.

Afterward, a distillation operation was carried out in the same manner as in Example 5 to obtain an epoxy group-containing acrylic resin. The thus obtained resin was free from any residual odor, and its particles had a substantially spherical shape.

Furthermore, 89 parts of this resin were blended with 11 parts of a curing agent (dodecanedicarboxylic acid), and the same procedure as in Example 1 was then repeated to obtain a baked and coated plate. The evaluation results about a coating film of the thus obtained coated plate are shown in Table 1. During the formation of a coating composition, any fine powder did not fly about, and the performance of the coating film was good.

EXAMPLE 11

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 5 parts of lauroyl peroxide, 1 part of t-butylperoxy-2-ethylhexanoate (Perbutyl O, made by Nippon Oils & Fats Co., Ltd.), 2 parts of t-butylperoxyisopropyl carbonate (Perbutyl I, made by Nippon Oils & Fats Co., Ltd.), 3 parts of α-methylstyrene dimer (Nofmer MSD, made by Nippon Oils & Fats Co., Ltd.) and 0.5 part of terpinolene (Terpinolene, made by Yasuhara Chemical Co., Ltd.), and suspension polymerization was then carried out at 120° C. for 2 hours in a closed system to obtain a suspension polymer. During the polymerization, a pressure in the reaction vessel was 5.2 kg/cm$^2$.

Afterward, a distillation operation was carried out in the same manner as in Example 5 to obtain an epoxy group-containing acrylic resin having a mean particle diameter of 430 μm. The thus obtained resin was free from any residual odor.

Table 1 shows the evaluation results of the characteristics of the obtained resin.

Next, 80 parts of this resin were blended with 20 parts of a curing agent (dodecanedicarboxylic acid), and the same procedure as in Example 1 was then repeated to obtain a baked and coated plate. The evaluation results about a coating film of the thus obtained coated plate are shown in Table 1. During the formation of a coating composition, any fine powder did not fly about, and the performance of the coating film was substantially good.

EXAMPLE 12

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 6 parts of benzoyl peroxide, 1 part of t-butyl peroxybenzoate (Perbutyl Z, made by Nippon Oils & Fats Co., Ltd.), 3 parts of α-methylstyrene dimer (Nofmer MSD, made by Nippon Oils & Fats Co., Ltd.) and 2 parts of terpinolene (Terpinolene, made by Yasuhara Chemical Co., Ltd.), and suspension polymerization was then carried out at 130° C. for 2 hours in a closed system to obtain a suspension polymer. During the polymerization, a pressure in the reaction vessel was 4.2 kg/cm$^2$.

Afterward, a distillation operation was carried out in the same manner as in Example 5 to obtain a resin for a powder coating composition comprising an epoxy group-containing acrylic resin having a mean particle diameter of 450 μm. The thus obtained resin was free from any residual odor.

Table 1 shows the evaluation results of the characteristics of the obtained resin.

Next, 80 parts of this resin were blended with 20 parts of a curing agent (dodecanedicarboxylic acid), and the same procedure as in Example 1 was then repeated to obtain a baked and coated plate. The evaluation results about a coating film of the thus obtained coated plate are shown in Table 1. During the formation of a coating composition, any fine powder did not fly about, and the performance of the coating film was substantially good.

EXAMPLE 13

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 30 parts of styrene, 10 parts of 2-hydroxypropyl methacrylate, 30 parts of iso-butyl methacrylate, 30 parts of glycidyl methacrylate, 4 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries), 2 parts of t-butylperoxyisopropyl carbonate (Perbutyl I, made by Nippon Oils & Fats Co., Ltd.), 3 parts of α-methylstyrene dimer (Nofmer MSD, made by Nippon Oils & Fats Co., Ltd.) and 0.5 part of terpinolene (Terpinolene, made by Yasuhara Chemical Co., Ltd.), and suspension polymerization was then carried out at 110° C. for 3 hours in a closed system to obtain a suspension polymer. During the polymerization, a pressure in the reaction vessel was 4.2 kg/cm$^2$.

Afterward, a distillation operation was carried out in the same manner as in Example 5 to obtain a resin for a powder coating composition comprising an epoxy group-containing acrylic resin having a mean particle diameter of 450 μm. The thus obtained resin was free from any residual odor.

Table 1 shows the evaluation results of the characteristics of the obtained resin.

Next, 80 parts of this resin and 20 parts of a curing agent (dodecanedicarboxylic acid) were molten and kneaded at a temperature of 100° C. for 30 minutes, and an aluminum plate was coated with the resultant mixture in a known manner and then baked at 170° C. for 20 minutes to obtain a coated plate having a coating film of 80 μm in thickness. The evaluation results about the coating film of the thus obtained coated plate are shown in Table 1. During the formation of a coating composition, any fine powder did not fly about, and the performance of the coating film was good.

Comparative Example 1

A mixture of 40 parts of styrene, 20 parts of methyl methacrylate, 10 parts of n-butyl acrylate, 10 parts of dibutyl fumarate, 20 parts of glycidyl methacrylate, 2 parts of azobisisobutylonitrile (V-60, made by Pure Chemical Industries) and 1 part of benzoyl peroxide was added dropwise over 4 hours to a mixture of 70 parts of toluene and 30 parts of n-butanol which is heated to 100° C. The reaction was further carried out for 10 hours.

Next, from the resultant reaction product, the solvent was removed at 200° C. under a pressure of 1 mmHg until the solvent was not dripped out any more, and the reaction product was then ground to obtain an acrylic resin having a mean particle diameter of 800 μm. The shape of the particles of the thus obtained resin was a polyhedron having sharp tips.

Table 2 shows the evaluation results of the characteristics of the obtained resin. The distribution of these particles were in a polydisperse state, and the resin having particle diameters of more than 1000 μm was present in a ratio of 42.2%, and the resin having particle diameters of less than 62 μm was present in a ratio of 1.7%.

Next, 86 parts of this resin were blended with 14 parts of a curing agent (dodecanedicarboxylic acid), and the same procedure as in Example 1 was then repeated to obtain a baked and coated plate. The evaluation results about the coating film of the thus obtained coated plate are shown in Table 2. The coating film was poor in smoothness, and during the formation of the coating film, some odor was observed.

Comparative Example 2

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 4 parts of benzoyl peroxide, 1 part of t-butyl peroxybenzoate (Perbutyl Z), made by Nippon Oils & Fats Co., Ltd.) and 3 parts of α-methylstyrene dimer (Nofmer MSD, made by Nippon Oils & Fats Co., Ltd.), and suspension polymerization was then carried out at 130° C. for 2 hours in a closed system to obtain a suspension polymer. During the polymerization, a pressure in the reaction vessel was 4.7 kg/cm$^2$.

Next, this suspension polymer was cooled to 40° C., and the obtained polymer was sufficiently washed with water and then dried to obtain an acrylic resin having a mean particle diameter of 480 μm. The thus obtained resin was free from any residual odor.

Table 2 shows the evaluation results of the characteristics of the obtained resin.

Next, the same procedure as in Example 1 was then repeated using the resin to obtain a baked and coated plate. The evaluation results about the coating film of the thus obtained coated plate are shown in Table 2. The coating film was poor in smoothness and hardness.

Comparative Example 3

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 1 part of 2,2'-azobis-2,4-dimethylvaleronitrile (V-65, made by Pure Chemical Industries), 1 part of 2,2'-azobis-2-methylbutyronitrile (V-59, made by Pure Chemical Industries) and 1 part of 2-ethylhexyl thioglycolate (OTG, made by Yodogawa Kagaku Kogyo Co., Ltd.), and suspension polymerization was then carried out at 75° C. for 2 hours to obtain a suspension polymer.

Next, after this suspension polymer was cooled to 40° C., the obtained polymer was sufficiently washed with water and then dried to obtain an acrylic resin having a mean particle diameter of 570 μm. During the washing of the polymer, a strong odor of the OTG was given off, and in the dried resin, the strong odor of the OTG was left.

Table 2 shows the evaluation results of the characteristics of the obtained resin.

Next, the same procedure as in Example 1 was then repeated using the resin to obtain a baked and coated plate. The evaluation results about the coating film of the thus obtained coated plate are shown in Table 2. The coating film was poor in smoothness and impact resistance, and during the formation of the coating film, the odor was given off.

Comparative Example 4

A solution obtained by sufficiently dissolving 0.005 part of manganese sulfate and 0.225 part of a polyvinyl alcohol, the 4% aqueous solution of which has a viscosity of 24 cps at 20° C. (LA-18, made by The Shin-Etsu Chemical Co., Ltd.), in 200 parts of deionized water was poured into a reaction vessel. Next, to this reaction vessel, there was added a mixture of 16 parts of styrene, 33 parts of methyl methacrylate, 21 parts of n-butyl methacrylate, 30 parts of glycidyl methacrylate, 5 parts of 2,2'-azobis-2,4-dimethylvaleronitrile (V-65, made by Pure Chemical Industries), 1 part of 2,2'-azobis-2-methylbutyronitrile (V-59, made by Pure Chemical Industries) and 3 parts of α-methylstyrene dimer (Nofmer MSD, made by Nippon Oils & Fats Co., Ltd.), and suspension polymerization was then carried out at 110° C. for 2 hours in a closed system to obtain a suspension polymer. During the polymerization, a pressure in the reaction vessel was 4.6 kg/cm$^2$.

Next, this suspension polymer was cooled to 40° C., and the obtained polymer was sufficiently washed with water and then dried to obtain an acrylic resin having a mean particle diameter of 420 μm. During the washing of the polymer, an odor of the monomers was given off, and in the dried resin, the odor of the monomers was left.

Table 2 shows the evaluation results of the characteristics of the obtained resin.

Next, 80 parts of this resin were blended with 20 parts of a curing agent (dodecanedicarboxylic acid), and the same procedure as in Example 1 was then repeated to obtain a baked and coated plate. The evaluation results about the coating film of the thus obtained coated plate are shown in Table 2. In the coating film, pinholes were formed, and its smoothness was poor, and during the formation of the coating film, an odor was given off.

Comparative Example 5

A mixture of 16 parts of styrene, 33 parts of methyl methacrylate, 21 parts of n-butyl methacrylate, 30 parts of glycidyl methacrylate, 4 parts of azobisisobutylonitrile (V-60, made by Pure Chemical Industries) and 1 part of benzoyl peroxide was added dropwise over 4 hours to a mixture of 70 parts of toluene and 30 parts of n-butanol which is heated to 130° C. The reaction was further carried out for 10 hours.

Next, from the resultant reaction product, the solvent was removed at 200° C. under a pressure of 1 mmHg until the solvent was not dripped out any more. The reaction product was then ground into 3000 μm or less to obtain an acrylic resin. The shape of the particles of the thus obtained resin was a polyhedron having sharp tips.

Table 2 shows the evaluation results of the characteristics of the obtained resin.

The distribution of these particles were in a polydisperse state, and the resin having particle diameters of more than 1000 μm was present in a ratio of 33.4%, and the resin having particle diameters of less than 62 μm was present in a ratio of 1.2%.

Furthermore, 80 parts of this resin were blended with 20 parts of a curing agent (dodecanedicarboxylic acid), and the same procedure as in Example 1 was then repeated to obtain a baked and coated plate. The evaluation results about the coating film of the thus obtained coated plate are shown in Table 2. During the formation of a coating composition, fine powder flew about, and the obtained coating film was poor in hardness and smoothness.

TABLE 1

| | | Example | | | | | | |
|---|---|---|---|---|---|---|---|---|
| | | 1 | 2 | 3 | 4 | 5 | 6 | 7 |
| Characteristics of resin | Mean particle diameter (μm) | 420 | 450 | 420 | 450 | 400 | 370 | 390 |
| | Ratio of particles having long diameters of less than 62 μm (wt %) | 1.5 | 1.4 | 1.2 | 1.2 | 1.3 | 1.6 | 0.1 |
| | Ratio of particles having short diameters of more than 1000 μm (wt %) | 2.3 | 2.4 | 2.4 | 2.5 | 2 | 1.8 | 1.2 |
| | Ratio of resin particles of 1 ≦ R/r ≦ 1.2 (%) | 99.2 | 99.4 | 99.5 | 99.3 | 99.4 | 99.4 | 99.6 |
| | Glass transition temperature (° C.) | 54 | 52 | 50 | 50 | 50 | 52 | 50 |
| | Softening temperature (° C.) | 117 | 107 | 112 | 110 | 117 | 107 | 117 |
| | Weight-average molecular weight (Mw) | 8500 | 10500 | 7900 | 7800 | 8400 | 10600 | 8400 |
| | Amount of volatile components (ppm) | 480 | 570 | 670 | 580 | 610 | 560 | 610 |
| | Epoxy equivalent (g/eq.) | 550 | 1020 | 557 | 555 | 564 | 1031 | 562 |
| Characteristics of coating film | Smoothness | ⊚ | ○ | ⊚ | ⊚ | ⊚ | ○ | ⊚ |
| | Hardness | HB | HB | HB | HB | HB | HB | HB |
| | Impact resistance (cm) | 30 | 20 | 30 | 30 | 30 | 20 | 30 |
| | Odor during high-temperature melting | ⊚ | ⊚ | ○ | ⊚ | ○ | ⊚ | ○ |
| | Pinholes | ○ | ○ | ○ | ○ | ○ | ○ | ○ |
| | Adhesive properties to a coated plate | ○ | ○ | ○ | ○ | ○ | ○ | ○ |

| | | Example | | | | | |
|---|---|---|---|---|---|---|---|
| | | 8 | 9 | 10 | 11 | 12 | 13 |
| Characteristics of resin | Mean particle diameter (μm) | 370 | 330 | 310 | 430 | 450 | 450 |
| | Ratio of particles having a long diameter of less than 62 μm (wt %) | 0.1 | 0.1 | 0.2 | 1.3 | 1.1 | 1.8 |
| | Ratio of particles having a short diameter of more than 1000 μm (wt %) | 1.4 | 1.1 | 1.2 | 1.9 | 2.2 | 1.8 |
| | Ratio of resin particles of 1 ≦ R/r ≦ 1.2 (%) | 99.6 | 99.6 | 99.7 | 99.8 | 99.9 | 99.4 |
| | Glass transition temperature (° C.) | 52 | 50 | 52 | 60 | 58 | 50 |
| | Softening temperature (° C.) | 107 | 117 | 107 | 126 | 123 | 112 |
| | Weight-average molecular weight (Mw) | 10600 | 8400 | 10600 | 15900 | 12800 | 10000 |
| | Amount of volatile components (ppm) | 560 | 610 | 560 | 500 | 380 | 680 |
| | Epoxy equivalent (g/eq.) | 1035 | 567 | 1025 | 580 | 1370 | 560 |

TABLE 1-continued

| | | | | | | | |
|---|---|---|---|---|---|---|---|
| Characteristics of coating film | Smoothness | ○ | ◎ | ○ | △ | △ | ○ |
| | Hardness | HB | HB | HB | HB | B | H |
| | Impact resistance (cm) | 20 | 30 | 20 | 20 | 30 | 30 |
| | Odor during high-temperature melting | ◎ | ○ | ◎ | ◎ | ◎ | ○ |
| | Pinholes | ○ | ○ | ○ | ○ | ○ | ○ |
| | Adhesive properties to a coated plate | ○ | ○ | ○ | ○ | △ | ◎ |

TABLE 2

| | | Comparative Example | | | | |
|---|---|---|---|---|---|---|
| | | 1 | 2 | 3 | 4 | 5 |
| Characteristics of resin | Mean particle diameter (μm) | 800 | 480 | 570 | 420 | 660 |
| | Ratio of particles having a long diameter of less than 62 μm (wt %) | 1.7 | 1 | 1.2 | 0.9 | 1.2 |
| | Ratio of particles having a short diameter of more than 1000 μm (wt %) | 42.2 | 1.9 | 2.8 | 1.8 | 33.4 |
| | Ratio of resin particles of $1 \leq R/r \leq 1.2$ (%) | 15.3 | 99.8 | 99.5 | 99.5 | 19.5 |
| | Glass transition temperature (° C.) | 47 | 60 | 62 | 50 | 47 |
| | Softening temperature (° C.) | 114 | 129 | 131 | 112 | 114 |
| | Weight-average molecular weight (Mw) | 32000 | 21000 | 23000 | 8500 | 7000 |
| | Amount of volatile components (ppm) | 2380 | 340 | 2220 | 3840 | 1530 |
| | Epoxy equivalent (g/eq.) | 922 | 1280 | 550 | 557 | 640 |
| Characteristics of coating film | Smoothness | × | △ | × | × | ○ |
| | Hardness | HB | B | HB | HB | B |
| | Impact resistance (cm) | 20 | 20 | 10 | 20 | 15 |
| | Odor during high-temperature melting | × | ◎ | × | × | × |
| | Pinholes | × | ○ | × | × | △ |
| | Adhesive properties to a coated plate | △ | △ | △ | △ | ○ |

POSSIBILITY OF INDUSTRIAL UTILIZATION

According to the present invention, there can be obtained a resin for a powder coating composition which is free from problems such as the fly of fine powder and an odor, so that the deterioration of a working environment can be prevented and workability is good, and the coating film has no pinholes and has excellent performances such as gloss and smoothness.

Furthermore, by using a suspension polymerization method, the resin for the powder coating composition of the present invention can be manufactured with a high productivity.

What is claimed is:

1. A powder coating composition comprising an epoxy group-containing acrylic resin particles and a curing agent, said curing agent contained to cure the epoxy group-containing acrylic resin particles and form a coating on a substrate, said epoxy group-containing acrylic resin particles (i) being a copolymer, having a weight-average molecular weight of 3000 to 20000, of a vinyl monomer mixture comprising 10 to 60% by weight of alkyl ester(s) of (meth)acrylic acid, 10 to 60% by weight of epoxy group-containing vinyl monomer(s) and other vinyl monomer(s), (ii) having a mean particle diameter in the range of 80 to 800 μm, (iii) including 95% by weight or more of particles satisfying the relation of $1 \leq R/r \leq 1.2$ wherein R is a long diameter and r is a short diameter of each particle, (iv) comprising 5% by weight or less of particles having long diameters R of less than 62 μm and 5% by weight or less of particles having short diameters r of more than 1000 μm, (v) including 1000 ppm or less of volatile components, and (vi) having an epoxy equivalent in the range of 350 to 1200 g/eq.

2. The powder coating composition according to claim 1 wherein the other vinyl monomer(s) is styrene monomer(s) and is contained in an amount of 10 to 50% by weight in the vinyl monomer mixture.

3. The powder coating composition according to claim 1 wherein said epoxy group-containing acrylic resin is prepared by a suspension polymerization method.

4. The powder coating composition according to claim 1 wherein said epoxy group-containing acrylic resin is prepared by the suspension polymerization method in which terpinolene is used as a chain transfer agent.

5. The powder coating composition according to claim 1, which is prepared by polymerizing a monomer mixture comprising 10 to 60% by weight of alkyl ester(s) of (meth) acrylic acid, 10 to 60% by weight of epoxy group-containing vinyl monomer(s), and other vinyl monomer(s) by suspension polymerization at a polymerization temperature of 80° C. or higher under a polymerization pressure of 2 kg/cm² or higher, followed by removing volatile components included in the suspension polymer.

* * * * *